US008302365B2

(12) United States Patent
Gee

(10) Patent No.: US 8,302,365 B2
(45) Date of Patent: Nov. 6, 2012

(54) PARTIALLY SELF-ERECTING WIND TURBINE TOWER

(76) Inventor: Anthony F. Gee, Tallahassee, FL (US)

( * ) Notice: Subject to any disclaimer, the term of this patent is extended or adjusted under 35 U.S.C. 154(b) by 0 days.

(21) Appl. No.: 12/660,371

(22) Filed: Feb. 25, 2010

(65) Prior Publication Data

US 2011/0314767 A1 Dec. 29, 2011

(51) Int. Cl.
*E04H 12/34* (2006.01)
*E04H 12/00* (2006.01)
(52) U.S. Cl. ............................. 52/745.17; 52/117; 52/632
(58) Field of Classification Search .................... 52/111, 52/113, 114, 118, 119, 121, 173.1, 632, 651.01, 52/651.07, 745.17, 745.18, 115, 116, 117, 52/120, 112
See application file for complete search history.

(56) References Cited

U.S. PATENT DOCUMENTS

| 1,334,485 | A |   | 3/1920  | Clipfell et al.           |
|-----------|---|---|---------|---------------------------|
| 1,734,245 | A |   | 11/1929 | Distefano                 |
| 2,484,291 | A |   | 10/1949 | Hays                      |
| 2,705,061 | A |   | 3/1955  | Getz                      |
| 2,784,556 | A |   | 3/1957  | Perdue                    |
| 3,248,831 | A | * | 5/1966  | Jones ................ 52/121 |
| 4,024,409 | A |   | 5/1977  | Payne                     |
| 4,366,386 | A |   | 12/1982 | Hanson                    |
| 4,557,629 | A | * | 12/1985 | Meek et al. ......... 405/204 |
| 4,580,377 | A | * | 4/1986  | Sundin ............... 52/121 |
| 4,785,309 | A | * | 11/1988 | Gremillion ........... 343/883 |
| 5,035,094 | A | * | 7/1991  | Legare ............... 52/118 |
| 5,218,375 | A | * | 6/1993  | Hillman ............... 343/883 |
| 5,315,795 | A | * | 5/1994  | Chae et al. .......... 52/113 |
| 6,064,123 | A |   | 5/2000  | Gislason                  |
| 6,157,088 | A |   | 12/2000 | Bendix                    |
| 6,320,273 | B1 |  | 11/2001 | Nemec                     |
| RE37,559 | E | * | 2/2002  | Marue et al. ......... 248/405 |
| 6,494,636 | B1 | * | 12/2002 | Mozena ............. 403/109.2 |
| 6,888,264 | B1 |  | 5/2005  | Willis et al.             |
| 6,979,170 | B2 |  | 12/2005 | Dery et al.               |
| 7,276,808 | B2 |  | 10/2007 | Weitkamp et al.           |
| 7,574,832 | B1 | * | 8/2009  | Lieberman .......... 52/118 |
| 7,993,107 | B2 | * | 8/2011  | Gevers ............. 416/244 R |
| 8,245,458 | B2 | * | 8/2012  | Johnson et al. ......... 52/152 |
| 2002/0050112 | A1 | * | 5/2002 | Koch et al. .......... 52/651.07 |
| 2002/0095878 | A1 | * | 7/2002 | Henderson ........... 52/116 |
| 2005/0005562 | A1 | * | 1/2005 | Henderson et al. ...... 52/633 |
| 2007/0175134 | A1 |   | 8/2007 | Christenson               |
| 2008/0236060 | A1 | * | 10/2008 | Battaglia ............ 52/121 |
| 2009/0211174 | A1 | * | 8/2009 | Henderson et al. ...... 52/40 |

(Continued)

FOREIGN PATENT DOCUMENTS

GB        2445157   A   *   7/2008

(Continued)

*Primary Examiner* — Basil Katcheves
*Assistant Examiner* — Rodney Mintz
(74) *Attorney, Agent, or Firm* — J. Wiley Horton

(57) ABSTRACT

A partially self-erecting wind turbine tower and a method for carrying out the assembly thereof. A central extendable pylon is provided. This is placed in an upright position, with its base on a temporary foundation. A plurality of legs is then attached to the extendable pylon. The upper extreme of each of the plurality of legs is temporarily attached to the upper extreme of the extendable pylon. With the pylon and legs thus secured, a nacelle is attached to the upper extreme of the extendable pylon. A hub with attached blades is then affixed to the nacelle. The extendable pylon is then forced upward through the collar to extend the height of the assembly.

20 Claims, 15 Drawing Sheets

U.S. PATENT DOCUMENTS

| | | | |
|---|---|---|---|
| 2010/0050557 A1* | 3/2010 | Falck-Schmidt | 52/632 |
| 2010/0132270 A1* | 6/2010 | Willey et al. | 52/79.5 |
| 2010/0146873 A1* | 6/2010 | Keller | 52/111 |
| 2010/0313494 A1* | 12/2010 | Ford | 52/111 |
| 2011/0056151 A1* | 3/2011 | Marmo et al. | 52/167.4 |
| 2011/0138721 A1* | 6/2011 | Bagepalli et al. | 52/299 |
| 2011/0185647 A1* | 8/2011 | Diniz et al. | 52/111 |
| 2011/0239584 A1* | 10/2011 | Tuong et al. | 52/745.17 |
| 2011/0314750 A1* | 12/2011 | Nies | 52/173.1 |
| 2012/0045345 A1* | 2/2012 | Horton et al. | 416/244 R |

FOREIGN PATENT DOCUMENTS

| | | | |
|---|---|---|---|
| GB | 2460551 A | * | 12/2009 |
| SU | 1232640 A | * | 5/1986 |
| WO | WO 2005028781 A2 | * | 3/2005 |
| WO | WO 2009068521 A2 | * | 6/2009 |

* cited by examiner

PARTIALLY SELF-ERECTING WIND TURBINE TOWER

CROSS-REFERENCES TO RELATED APPLICATIONS

Not applicable.

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates to the field of wind energy production. More specifically the invention comprises a partially self-erecting wind turbine tower which significantly reduces the lift height required for assembly of the components.

2. Description of the Related Art

FIG. 1 depicts a prior art wind turbine 10. Pylon 14—which may include two or more joined segments—is affixed via base 24 to foundation 12. Nacelle 16 houses a revolving horizontal shaft to which hub 18 and blades 20 are attached. The nacelle typically also contains a gearbox for stepping up the rotational speed of hub 18, a generator for converting the rotating shaft energy to electrical energy, control electronics, and a braking mechanism (which may be mechanical, electrical, or a combination of the two).

Nacelle 16 is attached to the top of pylon 14 via yaw joint 22. Drive mechanisms revolve the nacelle with respect to pylon 14 in order to point hub 18 into the wind. FIG. 1 depicts a prior art device in which the rotating blades are located upwind of the pylon, which is true for most wind turbines currently in production. There are many variations on this design. There are also prior art wind turbines in which the rotating blades are located downwind of the pylon. The present invention may be adapted for use with many different types of prior art turbines.

The use of a single pylon in the prior art requires the diameter "D" of foundation 12 to be quite large. The mass of the foundation is required to counteract the large overturning forces placed on the base. The foundation is generally cast from concrete, and the use of such a large structure adds to the overall cost of the wind turbine installation.

The components of a prior art wind turbines are typically installed using a crane. FIG. 2 shows crane 26 lifting nacelle 16 onto the top of the pylon. Boom 28 holds a cable to which hook 30 is attached. The height of the unitary pylon and nacelle will determine the "hook height." "Hook height" is a term of art in the rigging industry. It simply means the height above the ground for the engagement portion of a lifting hook. Boom 28 must of course extend above the hook height in order to allow some vertical space for the cable and pulley assemblies. The reader will thereby easily discern that the required hook height determines the size of crane needed for a particular wind turbine installation.

Prior art wind turbines are quite large. Blade lengths vary between 20 meters (66 feet) and 60 meters (197 feet). The largest wind turbines have overall heights of about 200 meters (656 feet with overall blade diameters of 125 meters (400 feet). A very large wind turbine will have a pylon height of about 100 meters (328 feet). Thus, a crane having a hook height of about 120 meters (394 feet) is needed to install the largest examples of prior art wind turbines. Such wind turbines are typically installed in remote locations, where access for large machinery is limited. Transporting extremely large cranes to such sites represents a substantial portion of the total cost of installing a wind turbine. Thus, a wind turbine tower design that could be erected using a smaller crane would be advantageous.

BRIEF SUMMARY OF THE INVENTION

The present invention comprises a partially self-erecting wind turbine tower and a method for carrying out the assembly thereof. A central extendable pylon is provided. This is placed in an upright position, with its base on a temporary foundation. A plurality of legs is they attached to the extendable pylon. The upper extreme of each of the plurality of legs are preferably attached to a collar surrounding the upper extreme of the extendable pylon.

With the pylon and legs this temporarily secured, a nacelle is attached to the upper extreme of the extendable pylon. A hub with attached blades is affixed to the nacelle. The extendable pylon is then forced upward through the collar to extend the height of the assembly. The extendable pylon is raised to its operational position with its lower extreme being affixed to the collar. By raising the extendable pylon, the nacelle and attached huh and blades are positioned an appropriate distance above the ground.

Figure 1:
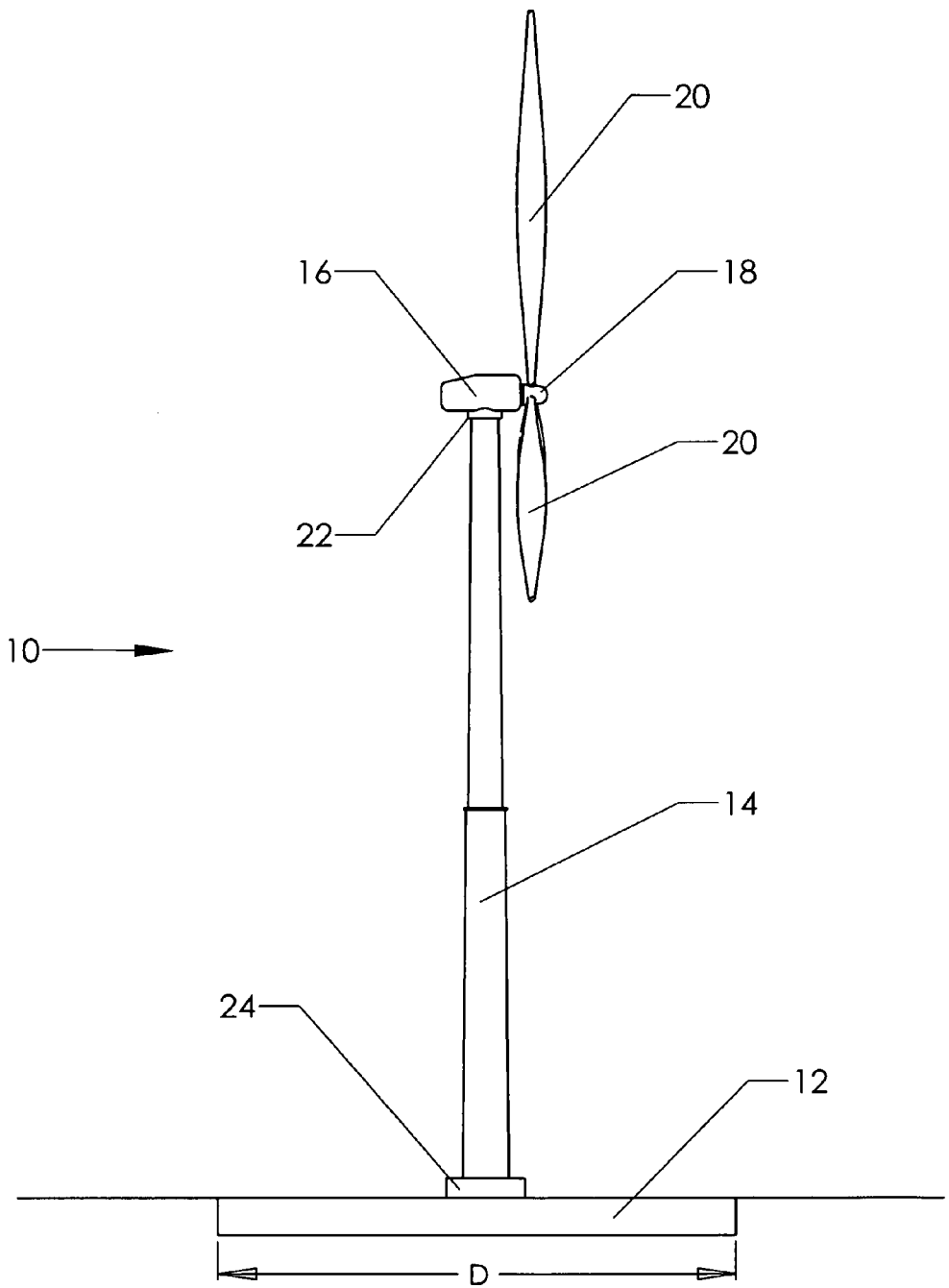
FIG. 1 is an elevation view, showing a prior art wind turbine.

| REFERENCE NUMERALS IN THE DRAWINGS | |
|---|---|
| 10 | wind turbine |
| 12 | foundation |
| 14 | pylon |
| 16 | nacelle |
| 18 | hub |
| 20 | blade |
| 22 | yaw joint |
| 24 | base |
| 26 | crane |
| 28 | boom |
| 30 | hook |
| 32 | extending pylon |
| 34 | collar |
| 36 | leg |
| 38 | split foundation |
| 40 | ground |
| 42 | rigging |
| 44 | base |
| 46 | temporary foundation |
| 49 | nacelle mount |
| 50 | column structure |
| 52 | collar sub-portion |
| 54 | rack |
| 56 | worm drive |
| 58 | reduction gearbox |
| 60 | motor |
| 62 | cable anchor |
| 64 | pulley |
| 66 | cable |

DETAILED DESCRIPTION OF THE INVENTION

Figure 3:
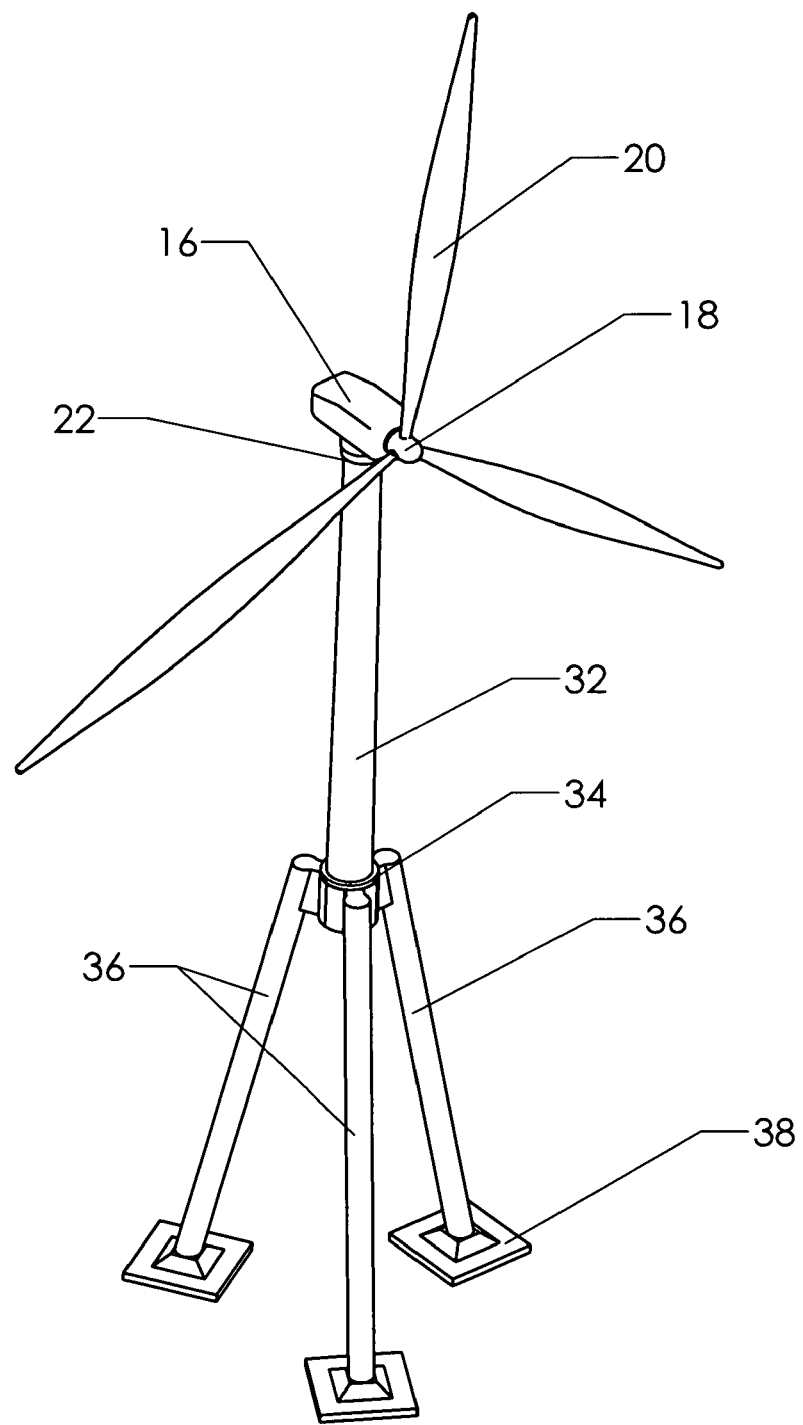
FIG. 3 is a perspective view, showing a wind turbine constructed according to the present invention.

FIG. 3 shows an embodiment of a wind turbine constructed according to the present invention. The support structure includes extendable pylon 32, which is supported by a plurality of legs 36. Rather than having a single unified foundation, a split foundation 38 is furnished for the base of each leg 36.

The upper portion of each leg 36 is preferably attached to a collar 34, which surrounds extendable pylon 32. The collar may formed by uniting portions of the legs themselves, or it may be a separate structure to which the legs are attached. Whatever form it takes, the collar provides a sliding attachment between the legs and extendable pylon 32, so that the extendable pylon can move up and down with respect to the legs.

The upper portions of the assembly shown are the same as those found in the prior art. Nacelle 16 is attached to the upper portion of the extendable pylon by yaw joint 22. Rub 18 is attached to the nacelle. Blades 20 are attached to the hub.

The assembly of the components depicted in FIG. 3 will now be described. The reader should bear in mind that the order of the steps could be altered, as will be apparent to those skilled in the art.

Figure 4:
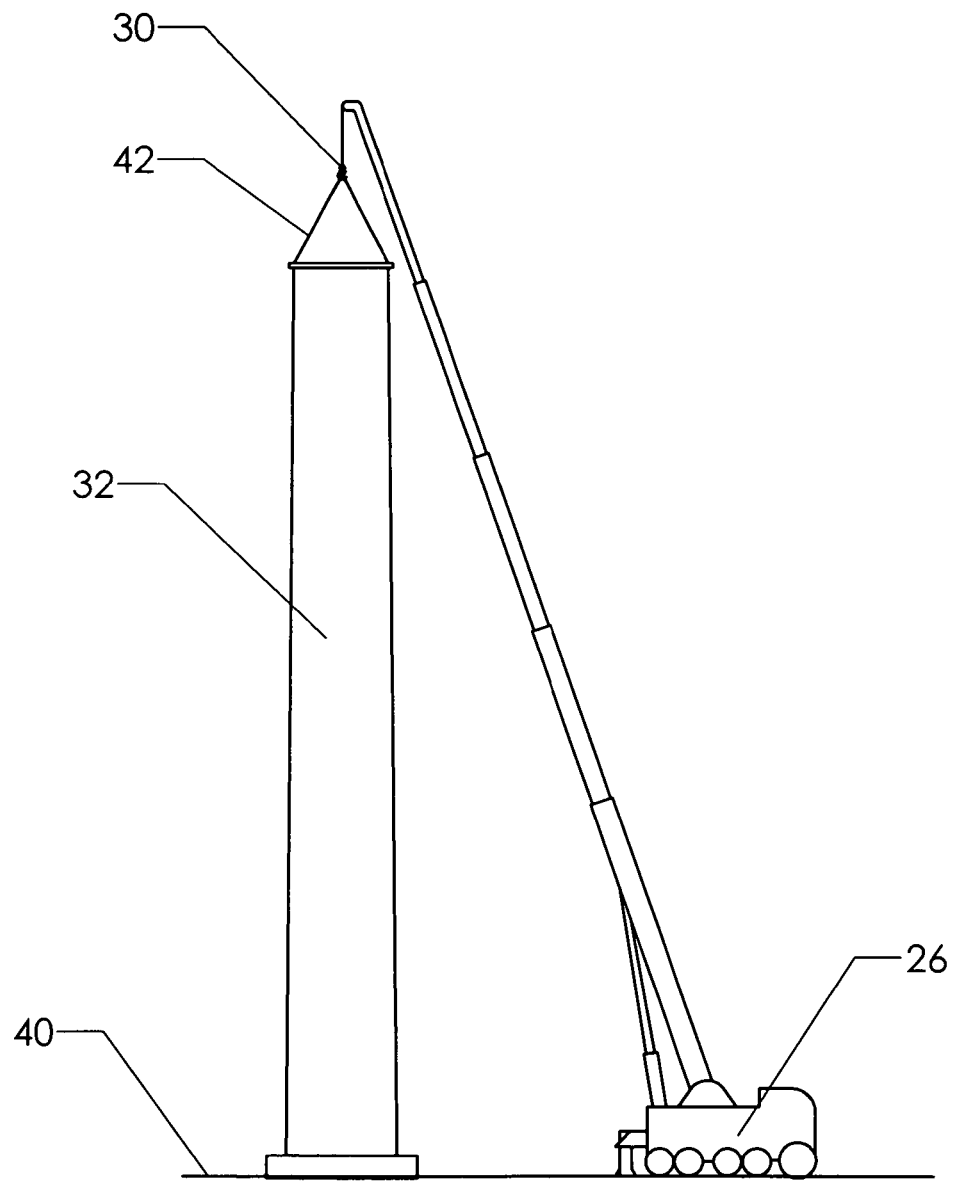
FIG. 4 is an elevation view, showing the use of a crane to erect a pylon according to the present invention.

FIG. 4 shows the first step in the process. Crane 26 is attached to extendable pylon 32 using rigging 42. The crane lifts the extendable pylon into a vertical orientation as shown. A temporary foundation is preferably provided beneath the base of extendable pylon 32 in order to provide stability. The extendable pylon is preferably secured to the temporary foundation.

Figure 5:
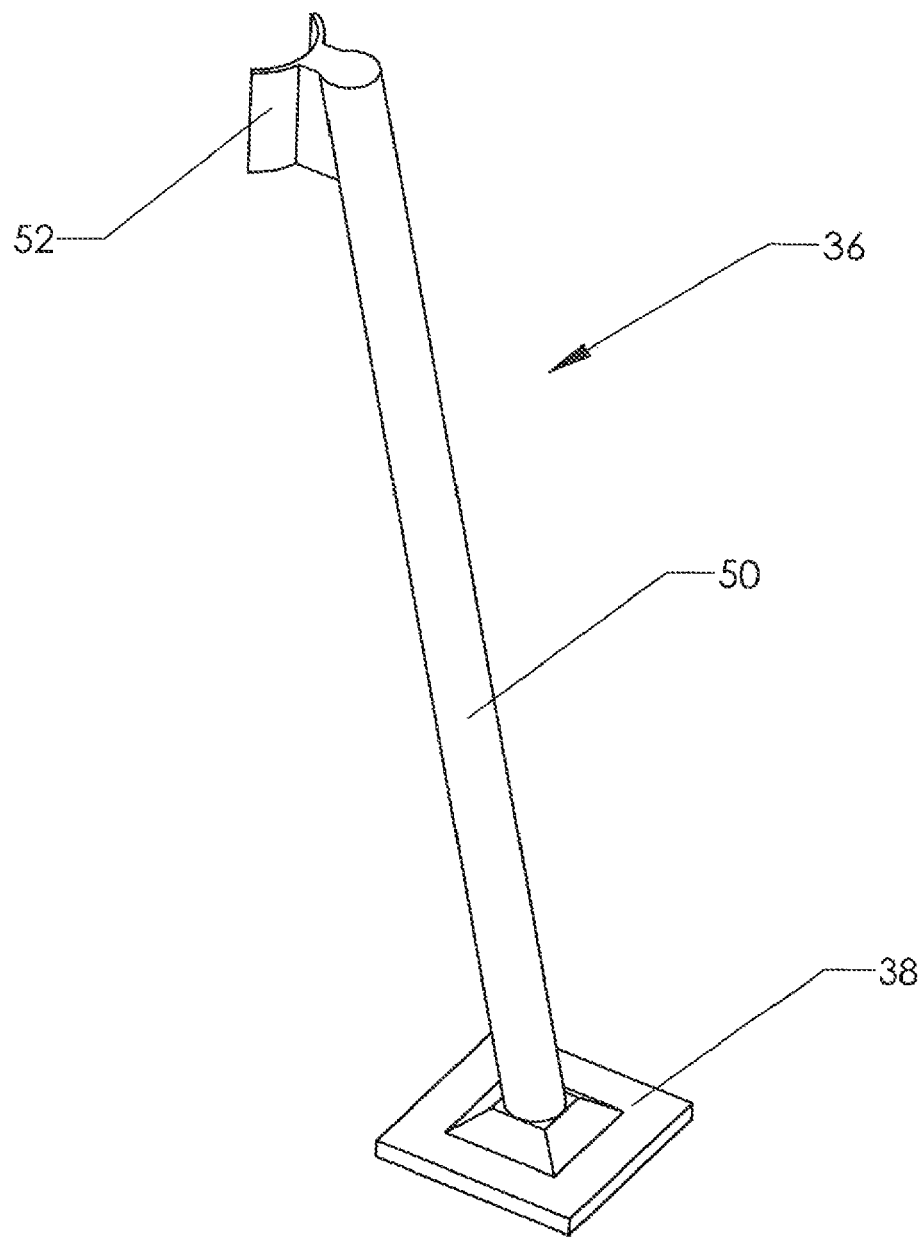
FIG. 5 is a perspective view, showing a leg assembly.

FIG. 5 shows one embodiment of leg 36 in more detail. Column structure 50 is attached to split foundation 38 at its lower extreme and collar sub-portion 52 at its upper extreme. In this version, the collar surrounding the extendable pylon is formed by uniting portions of the legs themselves. Thus, collar sub-portion 52 is provided as part of the leg assembly. The collar sub portion is one-third of a ring structure which will encircle the extendable pylon when all the legs are assembled.

The reader should understand that all the components are depicted in a "top level" fashion. As one example—pad 48 would typically include a number of through-holes to allow threaded studs embedded in the foundation to pass through the pad when it is placed in the proper position. Nuts would then be placed on these threaded shafts to lock the pad in places.

Likewise each collar sub-portion would typically include connecting flanges so that bolts or other devices can be used to secure each collar sub-portion to its neighbors. As these detailed components are well understood to those skilled in the art, they have been omitted in order to promote visual clarity.

Figure 6:
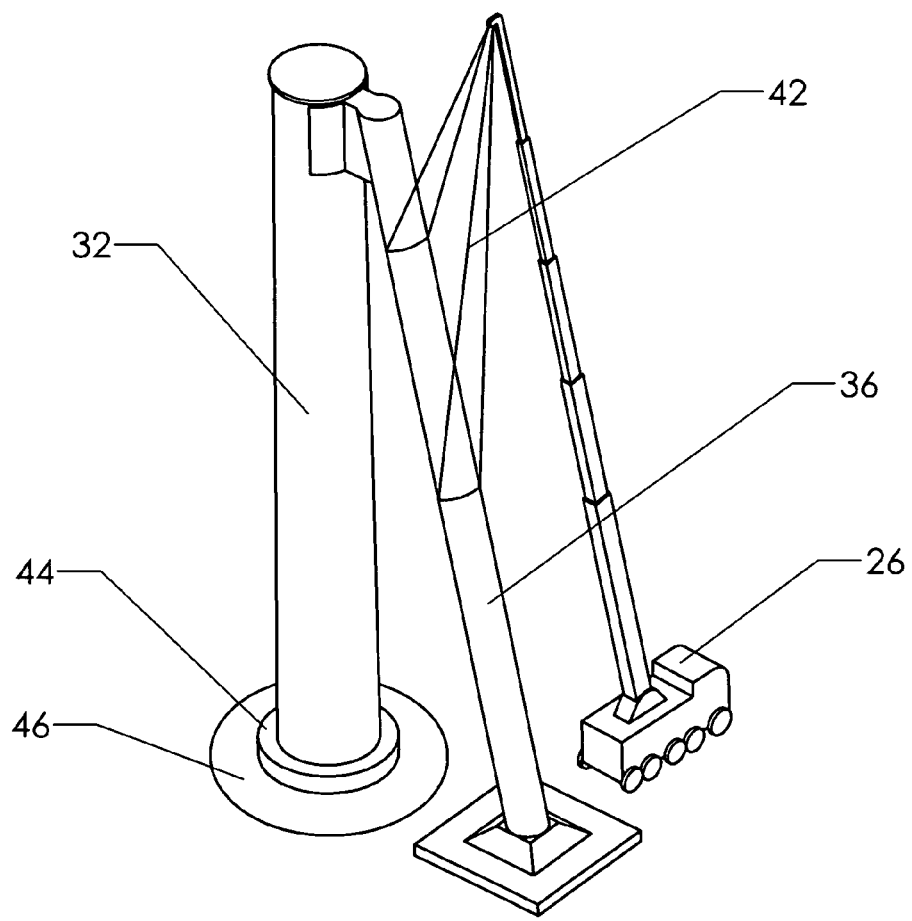
FIG. 6 is a perspective view, showing a crane attaching a leg to a pylon.

FIG. 6 is a perspective view showing crane 26 lifting leg 36 into position. Base 44 of extendable pylon 32 has been placed on temporary foundation 46. In this particular embodiment, the base is secured to the temporary foundation so that leg 36 can be leaned against the top of extendable pylon 32. The lower portion of the leg is then attached to the split foundation and the upper portion is attached to the extendable pylon (This is preferably a temporary attachment while the rest of the legs are placed in position).

Figure 7:
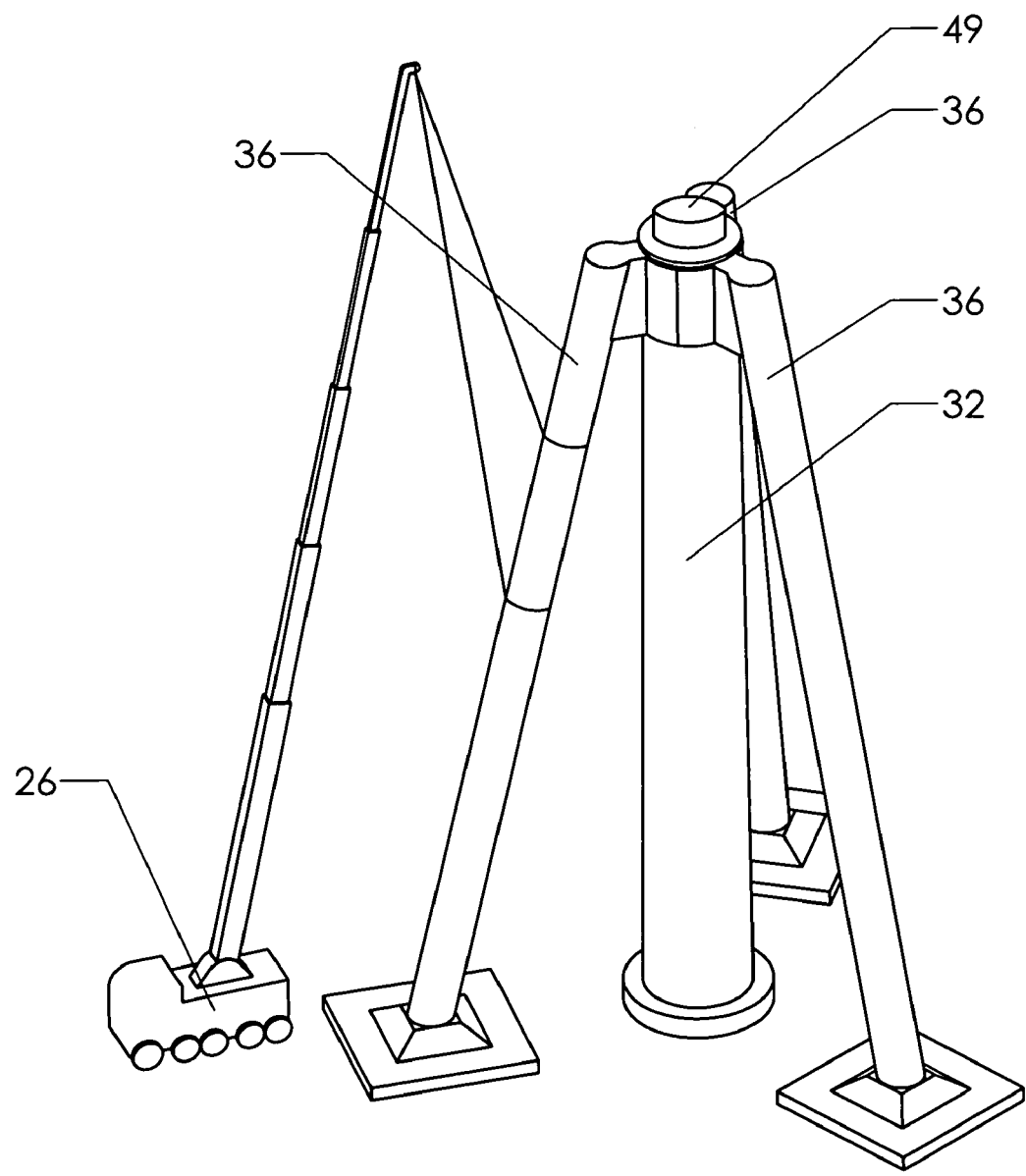
FIG. 7 is a perspective view, showing a crane attaching additional legs to a pylon.

FIG. 7 shows the assembly at a later stage, after all three legs 36 have been placed in position. The three collar sub-portions present in this embodiment have been united to form a collar around extendable pylon 32. Nacelle mount 49 is located on the top of the extendable pylon. Those skilled in the art will realize that once the structure is united as shown, it is very stable and crane 26 can be detached from the structure.

Figure 8:
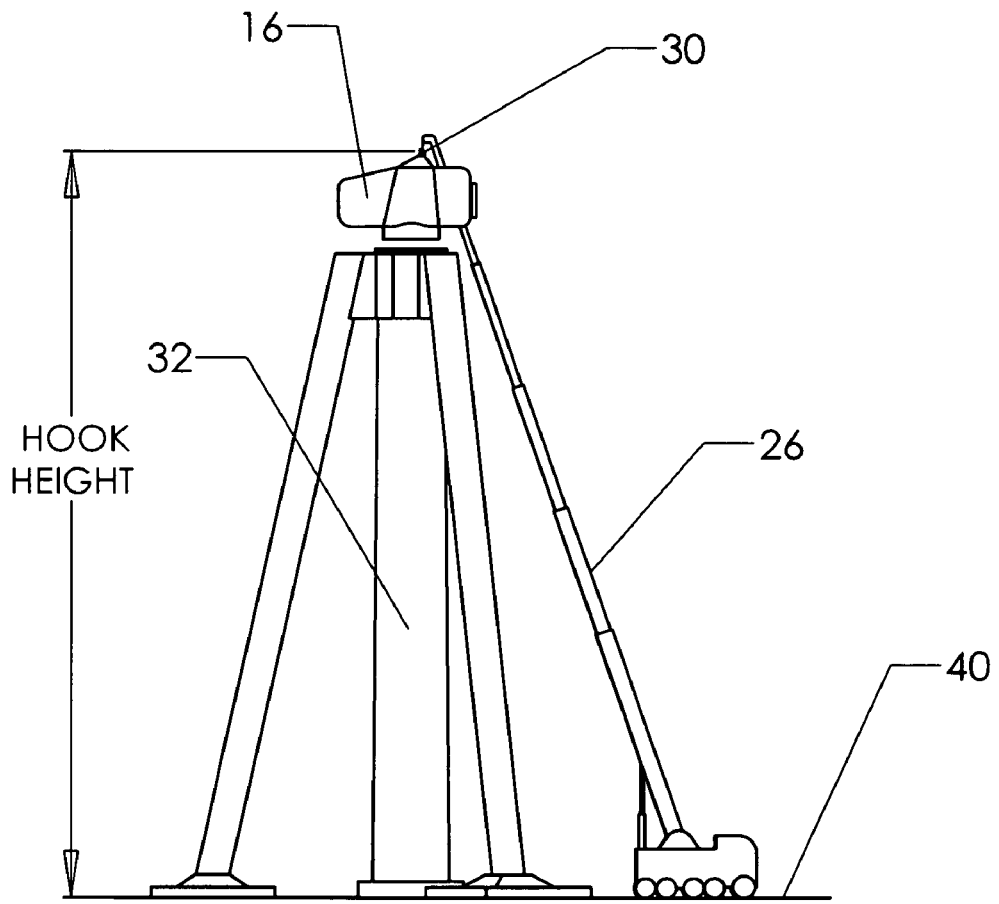
FIG. 8 is an elevation view, showing a crane attaching a nacelle to a pylon.
Figure 9A:
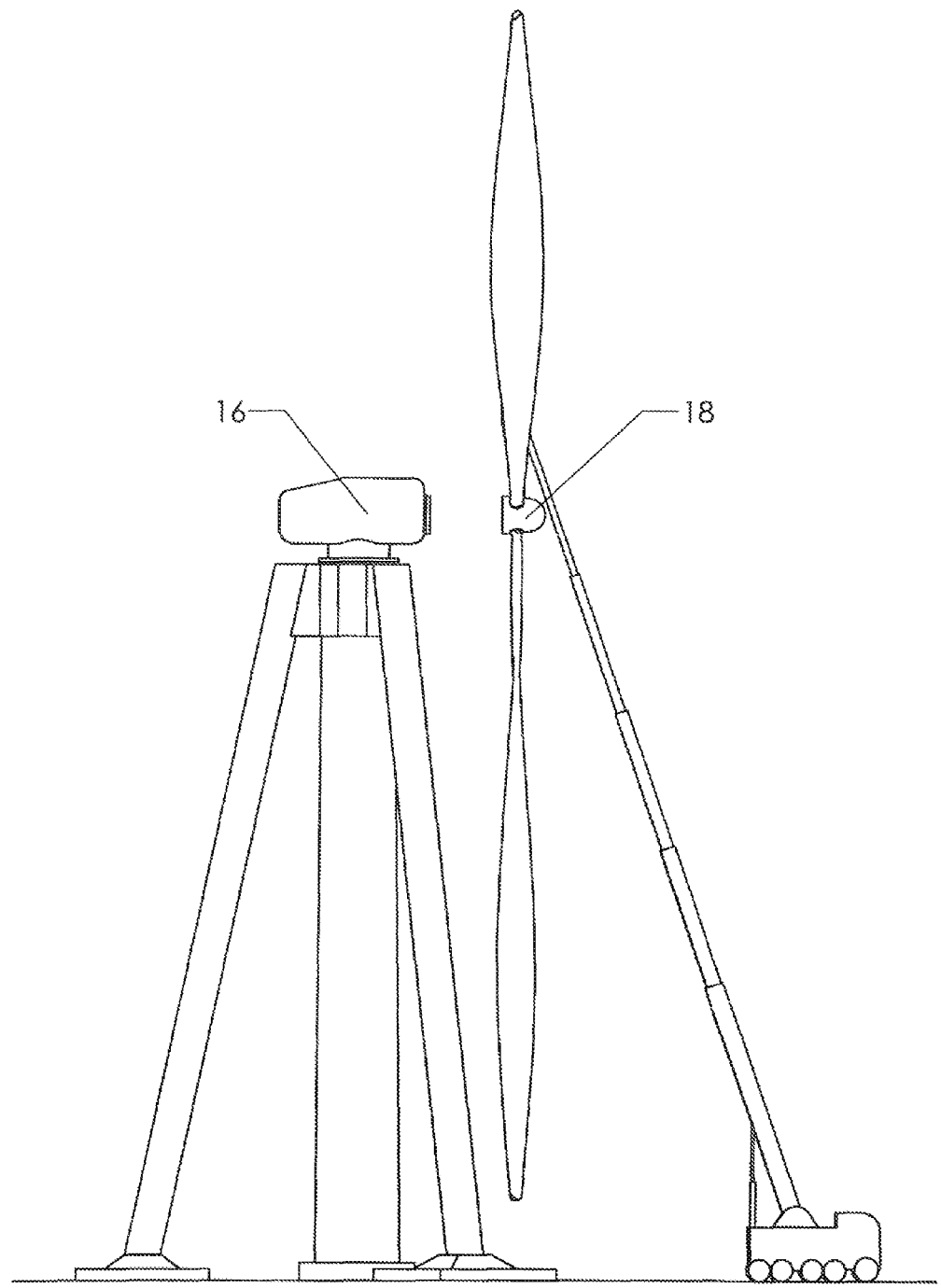
FIG. 9A is an elevation view, showing a crane attaching a hub and blades to a nacelle.
Figure 9B:
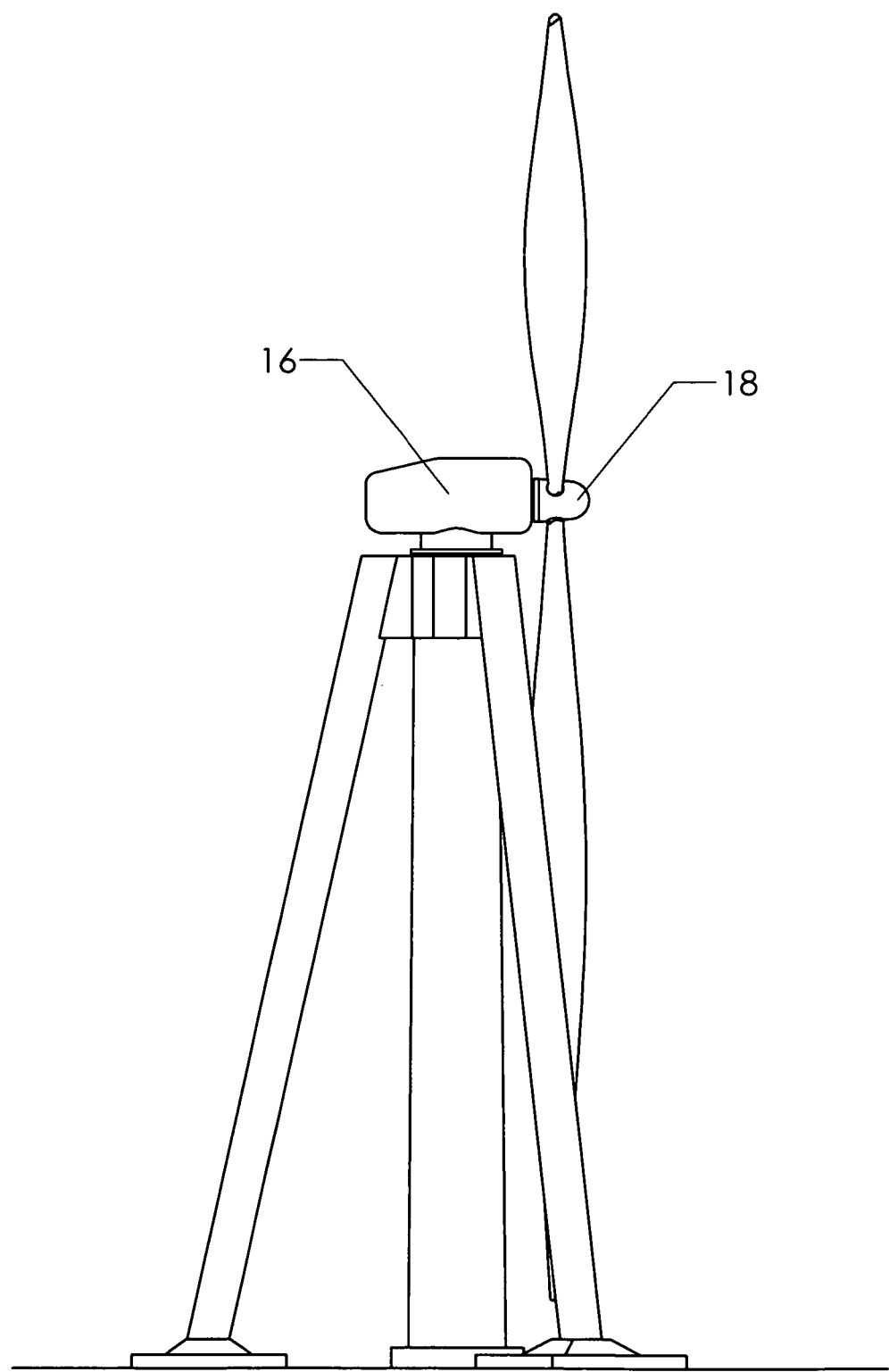
FIG. 9B is an elevation view, showing a hub and blades attached to a nacelle.

One of the present invention's key advantages is the fact that the nacelle, hub, and blades can be attached before the pylon assembly is raised to its full height. FIGS. 8, 9A, and 9B show these steps of the assembly process.

In FIG. 8, crane 26 has lifted nacelle 16 into position above extendable pylon 32. Once the nacelle is in this position the hub and blades can be attached. The blades are typically attached to the hub while the hub is lying on the ground. The hub with its attached blades is then lifted as an assembly. FIG. 9A shows the crane being used to lift hub 18 and its attached blades into position so that it can be connected to nacelle 16. The hub is attached to the nacelle as in the prior art. FIG. 9B shows the hub after it has been attached to the nacelle.

Figure 2:
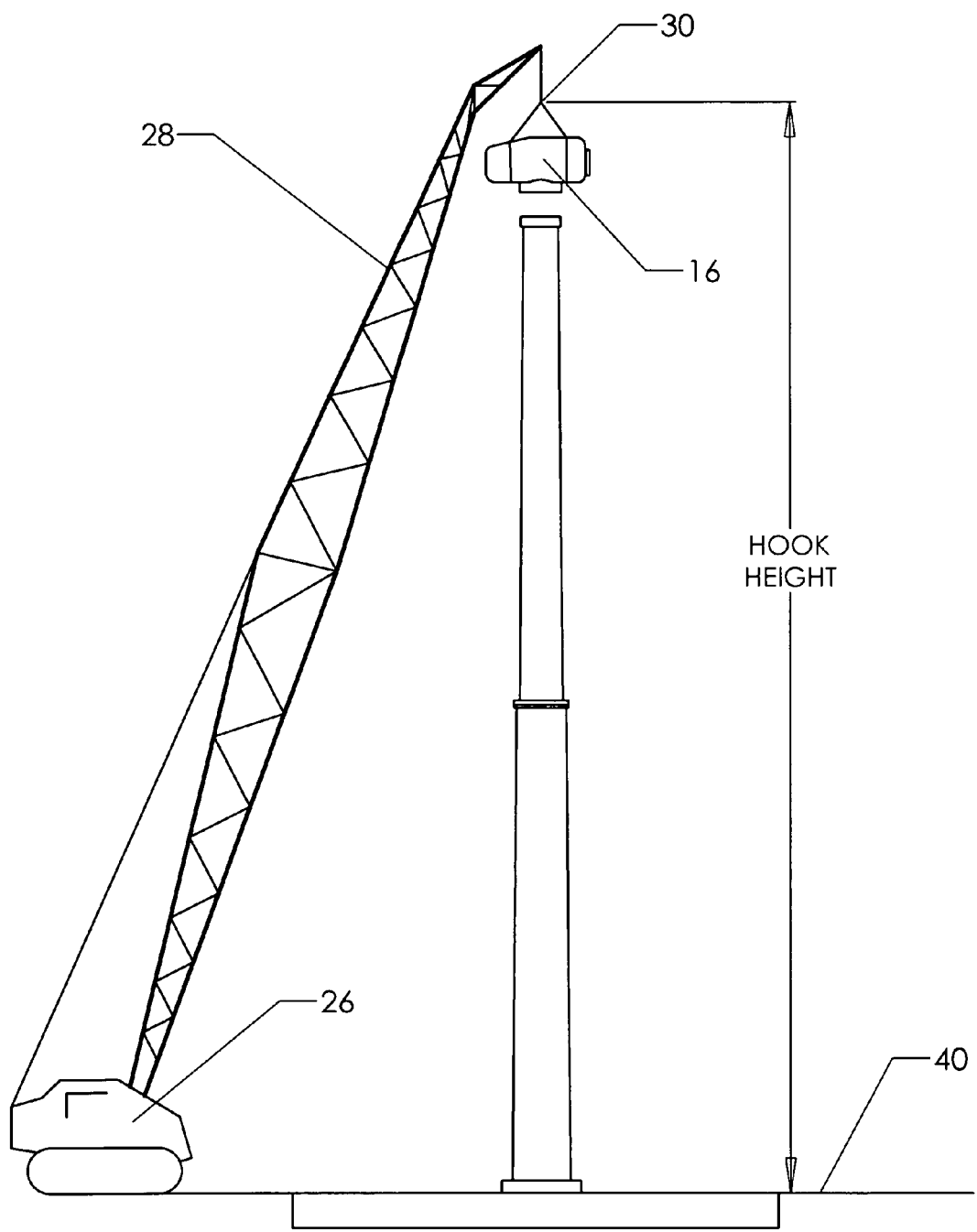
FIG. 2 is an elevation view, showing the use of a crane to assemble a prior art wind turbine.

The reader will observe how the hook height above the ground is substantially reduced in comparison to the prior art process shown at FIG. 2. The step shown in FIG. 8 is typically the highest lift that must be made during the assembly process. Thus, the height of the nacelle at that point will dictate the size of the crane needed for the assembly. Since the nacelle is considerably lower than for the prior art devices, a smaller crane can be used.

it is not necessary in the configuration shown in FIG. 9B to provide a free rotation path for all the blades—as the design is not intended to be operated in this configuration. The extendable pylon must be raised to place the nacelle in the proper position for operation.

Figure 10:
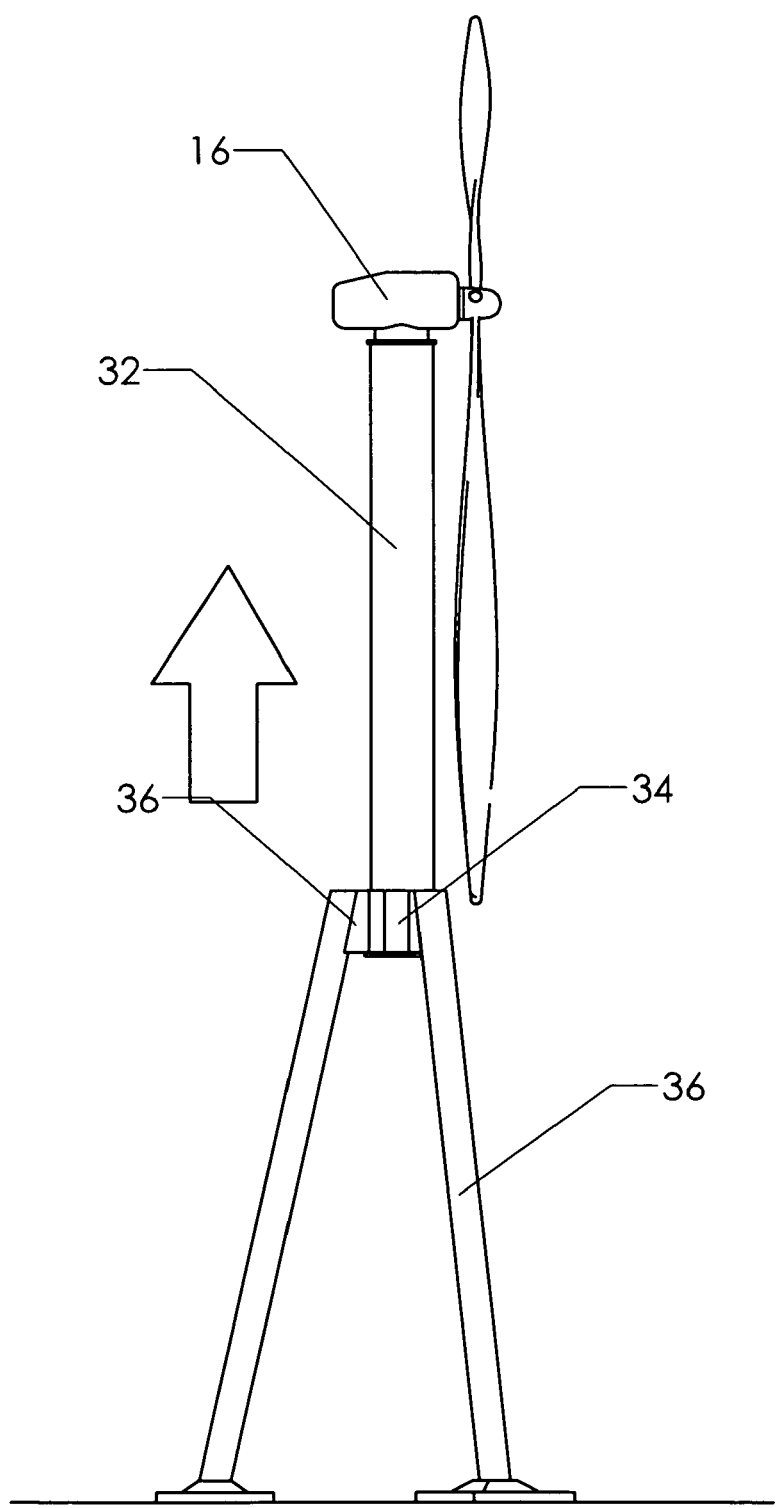
FIG. 10 is an elevation view, showing the extension of an extendable pylon.
Figure 11:
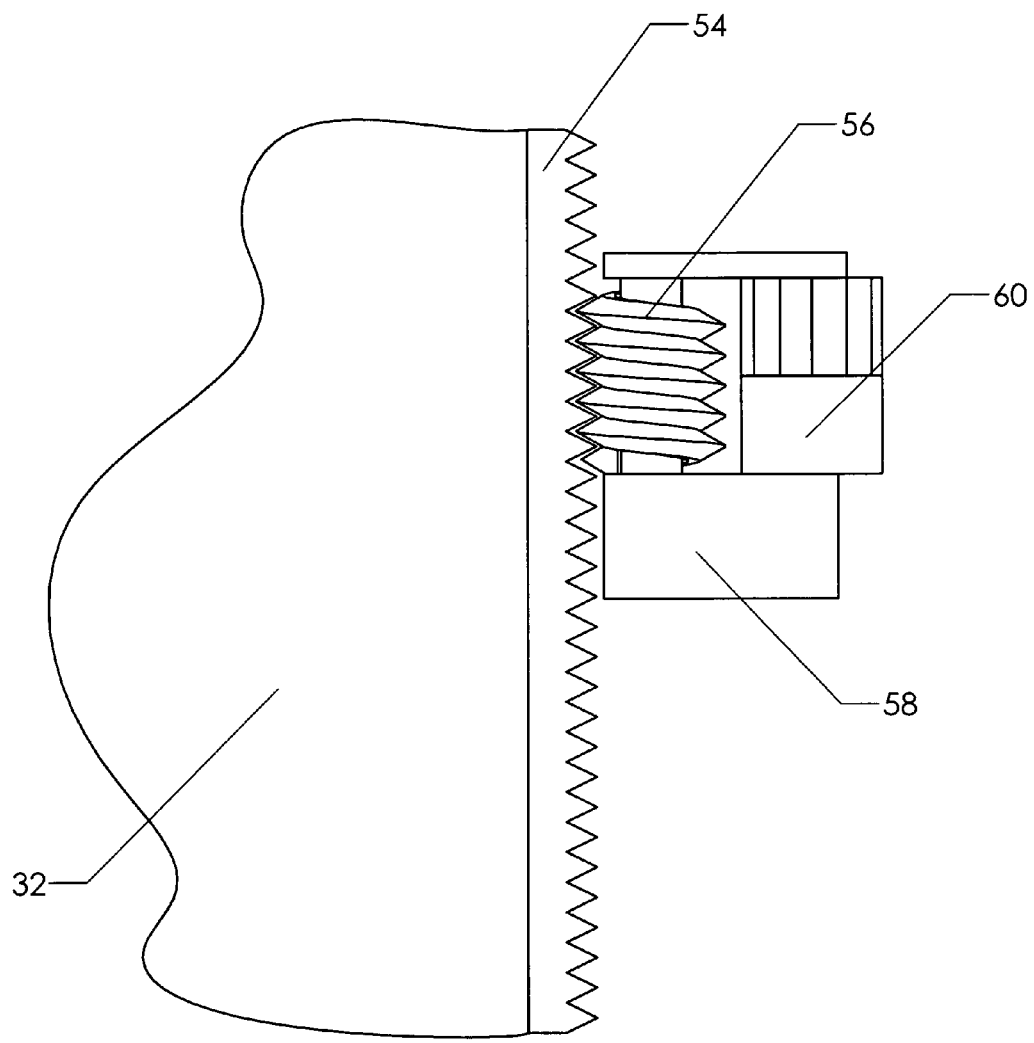
FIG. 11 is a detailed elevation view, showing one possible drive mechanism for an extendable pylon.

FIG. 10 shows the assembly of FIG. 9A with extendable pylon 32 raised to its operational position. Collar 34 preferably provides a sliding mount for the extendable pylon so that it can be slowly raised and then locked in position. Once in the position shown in FIG. 10 the tower assembly functions as a conventional prior art wind turbine tower. There are some notable structural differences, however. Returning briefly to FIG. 1, the reader will observe how base 24 of prior art pylon 14 attaches to foundation 12. Even moderate wind forces place a very large bending moment on the interface between the base and the foundation. As a result, the attachment features must be made very strong. In addition, the foundation must resist the resulting overturning forces using only its mass (It is typically a steel reinforced concrete pad). The foundation must be made very large and—with the escalating cost of concrete and steel—this contributes substantially to the overall expense.

Returning now to FIG. 3, the reader will observe how the bases of the three legs 36 shown are widely separated. If the outward angle of each leg is configured appropriately, the forces placed on split foundation 38 will be primarily axial loads with little to no bending moment. Thus, even though there are three separate foundations in the embodiment shown, the volume of concrete required is substantially less than for the single large foundation shown in FIG. 1.

Having received the information that the extendable pylon is raised to its operational position after the nacelle is installed, the reader may wish to know some examples of the types of mechanisms that could be used to perform the raising. The present invention is in no way dependent upon the type of raising mechanism actually selected, so the following examples should properly be viewed as two examples among many other possibilities.

There are two basic approaches to raising the extendable pylon. These shall be referred to as "internal" lifting mechanisms and "external" lifting mechanisms. In the internal approach, the lifting mechanism remains part of the tower assembly itself. In the external approach, the actual driving force for the lifting mechanism is external to the tower assembly. This latter approach is likely more cost-effective since once the tower is raised, it is likely to remain raised for extended periods. Thus, a single external lifting device could easily service several dozen wind turbine structures.

FIG. 1i shows one embodiment of an internal lifting mechanism. Extendable pylon has a rack 54 a linear gear) attached adjacent to each leg. Thus, for a version having three legs there would be three racks, A worm drive 56 engages each rack. Motor 60 drives worm drive 56 through reduction gearbox 58. The motor can be any type of motor, such as an electric motor or a hydraulic motor. The motor and worm drive are located in a suitable position, such as inside the top of each leg. With this arrangement, the motor assemblies in each of the three legs operate simultaneously to slowly raise extendable pylon 32. While feasible, the use of the worm gear and racks is not preferred because of the cost of fabricating such structures.

Figure 12:
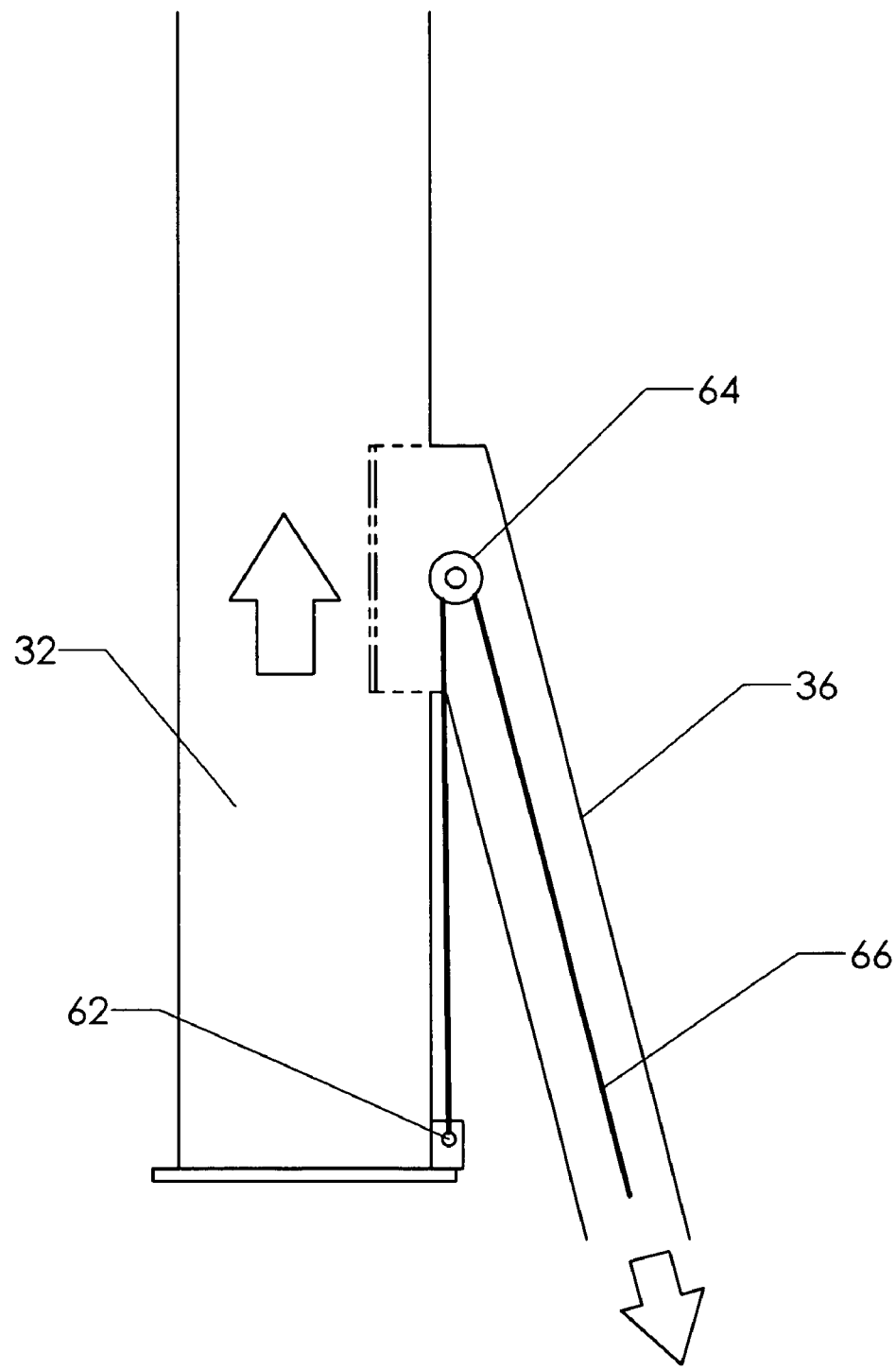
FIG. 12 is a detailed elevation view, showing another possible drive mechanism for an extendable pylon.

FIG. 12 shows an example of an embodiment using an external lifting device, in this embodiment each leg 36 features a pulley 64. A cable 66 is run through the hollow center of the leg, over pulley 64, and attached to cable anchor 62 on extendable pylon 32. An external winch is then used to apply tension to cable 66, thereby lifting the extendable pylon.

The advantage of this second approach is that the pulleys and cables are relatively inexpensive, and they are the only things which remain in the tower assembly. Thus, a single winch vehicle could service many different wind turbines.

Figure 14:
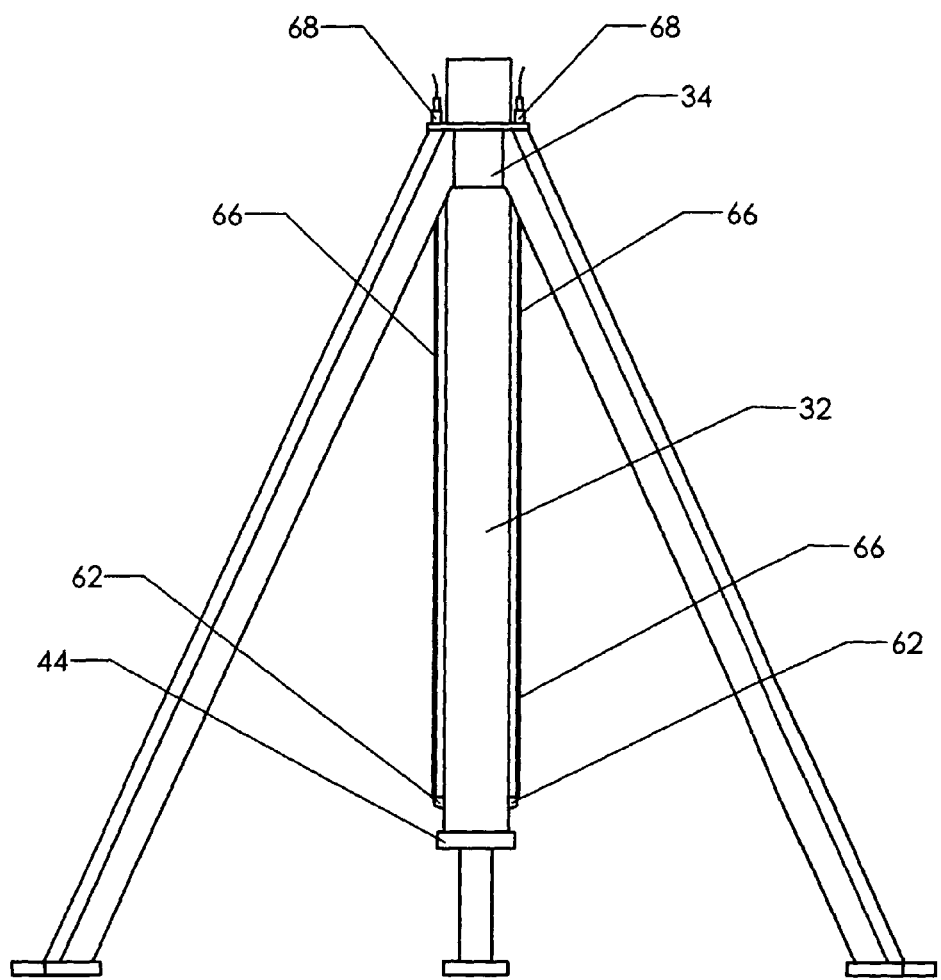
FIG. 14 is an elevation view, showing another drive mechanism for the extendable pylon.

FIG. 14 shows another type of lifting mechanism which can be made internal or external. The drawing shows an elevation view. Extendable pylon is equipped with a plurality of cables 66. These are anchored to the pylon by cable anchors 62 (which are placed in suitable locations). The cables pass up to the vicinity of collar 34. In this embodiment, the cables actually pass through the collar.

A prestressing jack 68 is placed on an upper surface of the collar. Those skilled in the art will know that prestressing jacks are used to prestress cables in steel-reinforced concrete assemblies. They have a center passage through which the cable is passed. The cable is then secured to an extendable piston. In the embodiment of FIG. 14, several prestressing jacks are supplied. Hydraulic pressure is applied (from an internal or external source) and the prestressing jacks raise the cables—thereby lifting the telescoping pylon.

As those skilled in the art will know, prestressing jacks can be configured to pull a cable for the length of a piston stroke, then reset the attachment between the piston and the cable at a lower position so that a new pull can be made. The cycle is then repeated for as many repetitions as are needed. Of course, other devices for holding the pylon in position while the jacks are reset can be employed.

Prestressing jacks could be used in an internal or external lifting configuration. They are relatively light and could be lifted into position as needed. Thus, a single set of jacks could serve many wind towers. Of course, they are also relatively inexpensive. Thus, in some applications, it would make sense to place a set of lifting jacks on each wind turbine.

Of course, the present invention provides operational options which simply were not present in the prior art. When high wind conditions are present in the prior art, the only option is to brake the spinning hub to a stop and feather the blades. Using the present invention, it is possible to lower the height of the nacelle to roughly half its operational height. If the leg design is modified to provide clearance this feature could make it possible to continue generating electricity even in high winds. Those skilled in the art will know that wind speed tapers significantly at lower altitude. The operational advantage of providing internal raising and lowering drives for the extendable pylon—thereby providing relatively rapid movement of the extendable pylon—may be sufficient in some circumstances to warrant the additional cost of such systems (though in many applications this may not be true).

Those skilled in the art will also realize that the ability to lower the height of the nacelle, hub, and blades will greatly facilitate maintenance operations. This is true regardless of whether the internal or external lifting approach is selected.

Figure 13:
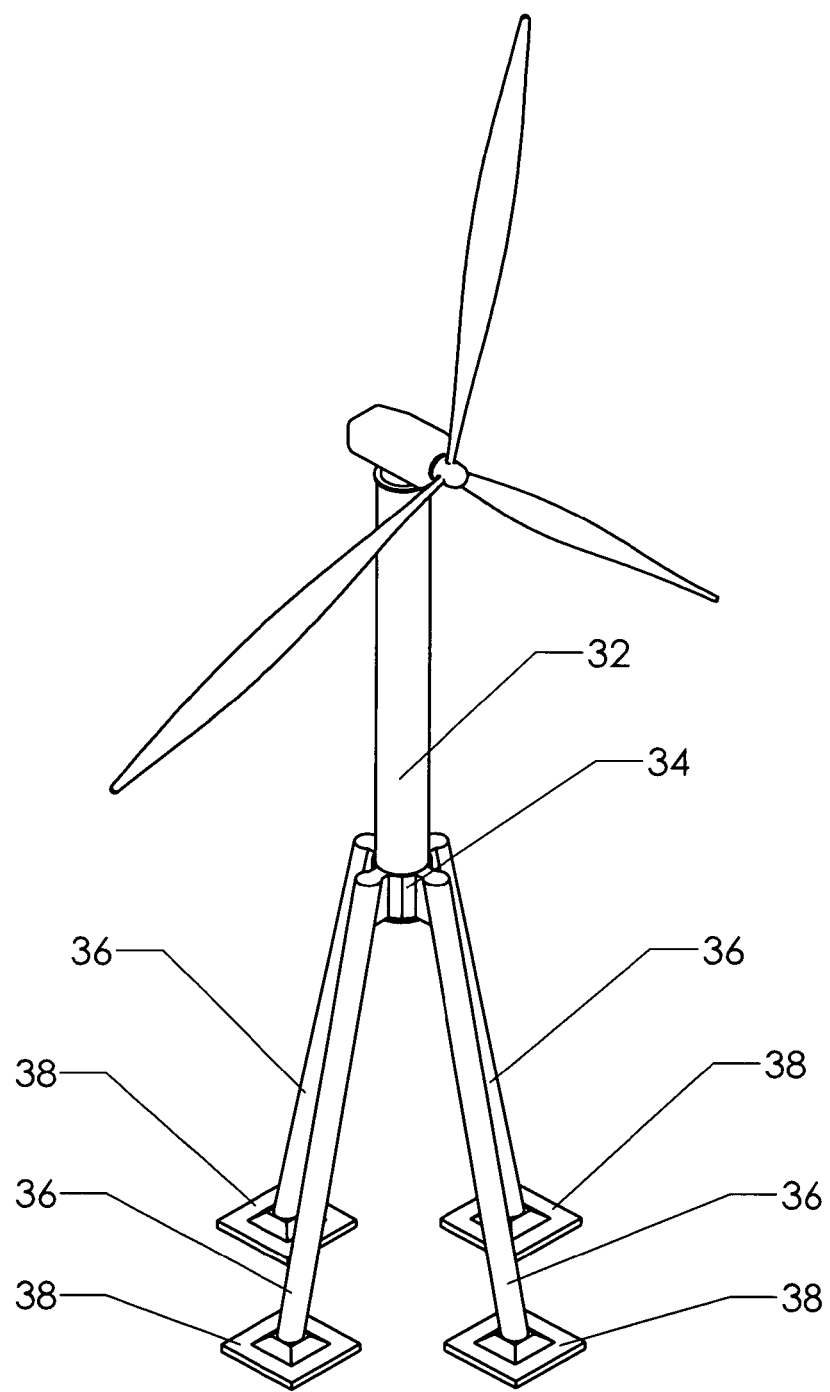
FIG. 13 is a perspective view, showing an alternate embodiment for the present invention

The number of legs selected for the assembly will depend upon many conditions and the invention is by no means limited to using only three legs. FIG. 13 shows an embodiment using four legs 36 and four split foundations 38. Five, six, or even more legs might be used to suit particular conditions. Those skilled in the art will also realize that the legs should ideally have a tubular cross section to minimize weight and cost. However, any sufficiently strong cross section could be used.

The preceding description contains significant detail regarding the novel aspects of the present invention. It should not be construed, however, as limiting the scope of the invention but rather as providing illustrations of the preferred embodiments of the invention. As one example, the unitary structures depicted for the extendable pylon and the legs could be made as multi-piece assemblies that are unified during the construction of the tower. Thus, the scope of the invention should be fixed by the following claims, rather than by the examples given.

Having described my invention, I claim:

1. A method of erecting a wind turbine tower and attaching said wind turbine to the ground, comprising:
   a. providing an extendable pylon, having a base and a top;
   b. providing at least three rigid legs, wherein each of said legs has a lower extreme and an upper extreme;
   c. providing a nacelle;
   d. providing a hub;
   e. providing a plurality of blades;

f. placing said base of said extendable pylon on said ground and placing said extendable pylon in a vertical orientation;

g. placing said lower extreme of each of said legs on said ground, with said lower extreme of each leg being laterally displaced from said base of said extendable pylon, so that an angle formed between said extendable pylon as said extendable pylon sits on said ground and said leg is an acute angle, and placing said upper extreme of each of said legs proximate said top of said extendable pylon;

h. providing a collar fixedly attached to said legs proximate said upper extreme of each of said legs and slidably attached to said extendable pylon;

i. locking said collar in position with respect to said ground by attaching each of said lower extremes of said legs to said ground;

j. attaching said plurality of blades to said hub;

k. attaching said hub to said nacelle;

l. forcing said extendable pylon upward into a raised position where said base of said telescoping pylon lies proximate said collar, and in said raised position, no portion of said base of said extendable pylon directly contacts said ground; and m. fixing said extendable pylon in said raised position.

2. A method of erecting a wind turbine tower as recited in claim 1, further comprising;
   a. providing a gear-driven drive system between said collar and said extendable pylon; and
   b. engaging said gear-driven drive system to perform said step of forcing said extendable pylon upward.

3. The method of erecting a wind turbine tower as recited in claim 1, further comprising:
   a. providing a cable anchor on said extendable pylon;
   b. providing a cable affixed to said cable anchor; and
   c. applying tension to said cable in order to perform said step of forcing said extendable pylon upward.

4. The method of erecting a wind turbine tower as recited in claim 3, further comprising using a lifting jack to apply said tension to said cable.

5. The method of erecting a wind turbine as recited in claim 1, wherein said extendable pylon is comprised of at least two segments.

6. The method of erecting a wind turbine as recited in claim 1, wherein said collar is formed by uniting a plurality of collar sub-portions.

7. A method of erecting a wind turbine tower and attaching said wind turbine to the ground, comprising:
   a. providing an extendable pylon, having a base and a top;
   b. providing at least three rigid legs, wherein each of said legs has a lower extreme and an upper extreme, with a collar sub-portion located proximate said upper extreme;
   c. providing a nacelle;
   d. providing a hub;
   e. providing a plurality of blades;
   f. placing said base of said extendable pylon on said ground and placing said extendable pylon in a vertical orientation;
   g. placing said lower extreme of each of said legs on said ground and placing said collar sub-portion of each of said legs proximate said top of said extendable pylon, with said lower extreme of each leg being laterally displaced from said base of said extendable pylon, so that an angle formed between said extendable pylon as said extendable pylon sits on said ground and said leg is an acute angle;
   h. uniting said collar sub-portions to form a collar slidably attached to said extendable pylon;
   i. attaching said lower extreme of each leg to said ground, thereby making said collar and said legs a rigid structure;
   j. attaching said plurality of blades to said hub;
   k. attaching said hub to said nacelle;
   l. forcing said extendable pylon upward into a raised position where said base of said extendable pylon lies proximate said collar, and in said raised position, no portion of said base of said extendable pylon directly contacts said ground; and
   m. fixing said extendable pylon in said raised position.

8. The method of erecting a wind turbine tower as recited in claim 7, further comprising:
   a. providing a gear-driven drive system between said plurality of legs and said extendable pylon; and
   b. engaging said gear-driven drive system to perform said step of forcing said extendable pylon upward.

9. The method of erecting a wind turbine tower as recited in claim 7, further comprising:
   a. providing a cable anchor on said extendable pylon;
   b. providing a cable affixed to said cable anchor; and
   c. applying tension to said cable in order to perform said step of forcing said extendable pylon upward.

10. The method of erecting a wind turbine tower as recited in claim 9, further comprising using a lifting jack to apply said tension to said cable.

11. The method of erecting a wind turbine as recited in claim 7, wherein said extendable pylon is comprised of at least two segments.

12. The method of erecting a wind turbine as recited in claim 7, wherein said collar sub-portions are integral to said legs.

13. A method of erecting a wind turbine tower and attaching said wind turbine to the ground, comprising:
   a. providing an extendable pylon, having a base and a top;
   b. providing a first leg, having a lower extreme and an upper extreme;
   c. providing a second leg having a lower extreme and an upper extreme;
   d. providing a third leg, having a lower extreme and an upper extreme;
   e. providing a nacelle;
   f. providing a hub;
   g. providing a plurality of blades;
   h. placing said base of said extendable pylon on said ground and placing said extendable pylon in a vertical orientation;
   i. placing said lower extreme of said first leg on said ground and placing said upper extreme of said first leg proximate said top of said extendable pylon, with said lower extreme of said first leg being laterally displaced from said base of said extendable pylon, so that an angle formed between said extendable pylon as said extendable pylon sits on said ground and said first leg is an acute angle;
   j. placing said lower extreme of said second leg on said ground and placing said upper extreme of said second leg proximate said top of said extendable pylon, with said lower extreme of said second leg being laterally displaced from said base of said extendable pylon, so that an angle formed between said extendable pylon as said extendable pylon sits on said ground and said second leg is an acute angle;
   k. placing said lower extreme of said third leg on said ground and placing said upper extreme of said third leg proximate said top of said extendable pylon, with said lower extreme of said third leg being laterally displaced from said base of said extendable pylon, so that an angle formed between said extendable pylon as said extendable pylon sits on said ground and said third leg is an acute angle;
l. locking said upper extremes of said first, second, and third legs together;
m. attaching said lower extremes of said first, second, and third legs to said ground;
n. providing a sliding connection between said upper extremes of said first, second, and third legs and said extendable pylon;
o. attaching said plurality of blades to said hub;
p. attaching said hub to said nacelle;
q. forcing said extendable pylon upward into a raised position where said base of said extendable pylon lies proximate said upper extreme of said legs, and in said raised position, no portion of said base of said extendable pylon directly contacts said ground; and
r. fixing said extendable pylon in said raised position.

14. The method of erecting a wind turbine tower as recited in claim 13, further comprising:
a. providing a gear-driven drive system between each of said legs and said extendable pylon; and
b. engaging said gear-driven drive system to perform said step of forcing said extendable pylon upward.

15. The method of erecting a wind turbine tower as recited in claim 13, further comprising:
a. providing a cable anchor on said extendable pylon;
b. providing a cable affixed to said cable anchor; and
c. applying tension to said cable in order to perform said stop forcing said extendable pylon upward.

16. The method of erecting a wind turbine tower as recited in claim 15, further comprising using a lifting jack to apply said tension to said cable.

17. The method of erecting a wind turbine as recited in claim 13, wherein said extendable pylon is comprised of at least two segments.

18. The method of erecting a wind turbine as recited in claim 13, wherein said upper extremes of each of said legs form a collar surrounding said extendable pylon.

19. The method of erecting a wind turbine as recited in claim 13 further comprising:
a. providing a fourth leg having an upper extreme and a lower extreme; and
b. placing said lower extreme of said fourth kg on said ground and placing said upper extreme of said fourth leg proximate said top of said extendable pylon.

20. The method of erecting a, wind turbine as recited in claim 19, wherein said upper extremes of each of said legs form a collar surrounding said extendable pylon.

* * * * *